United States Patent Office.

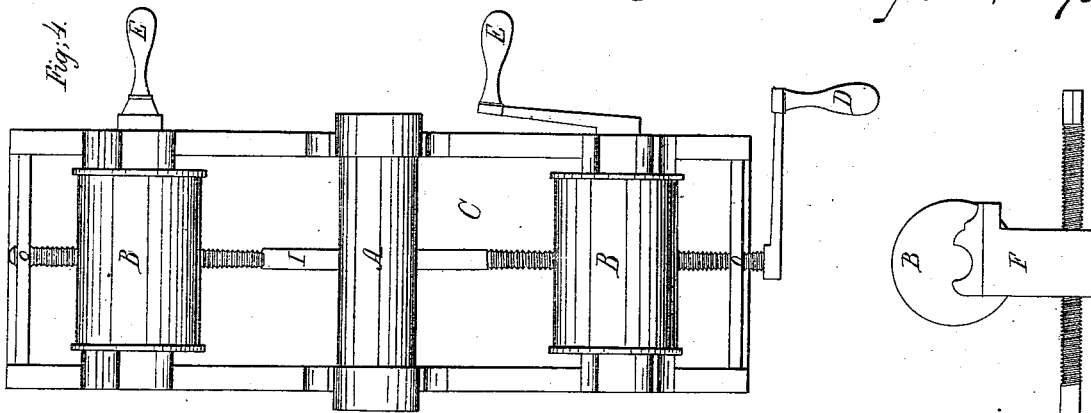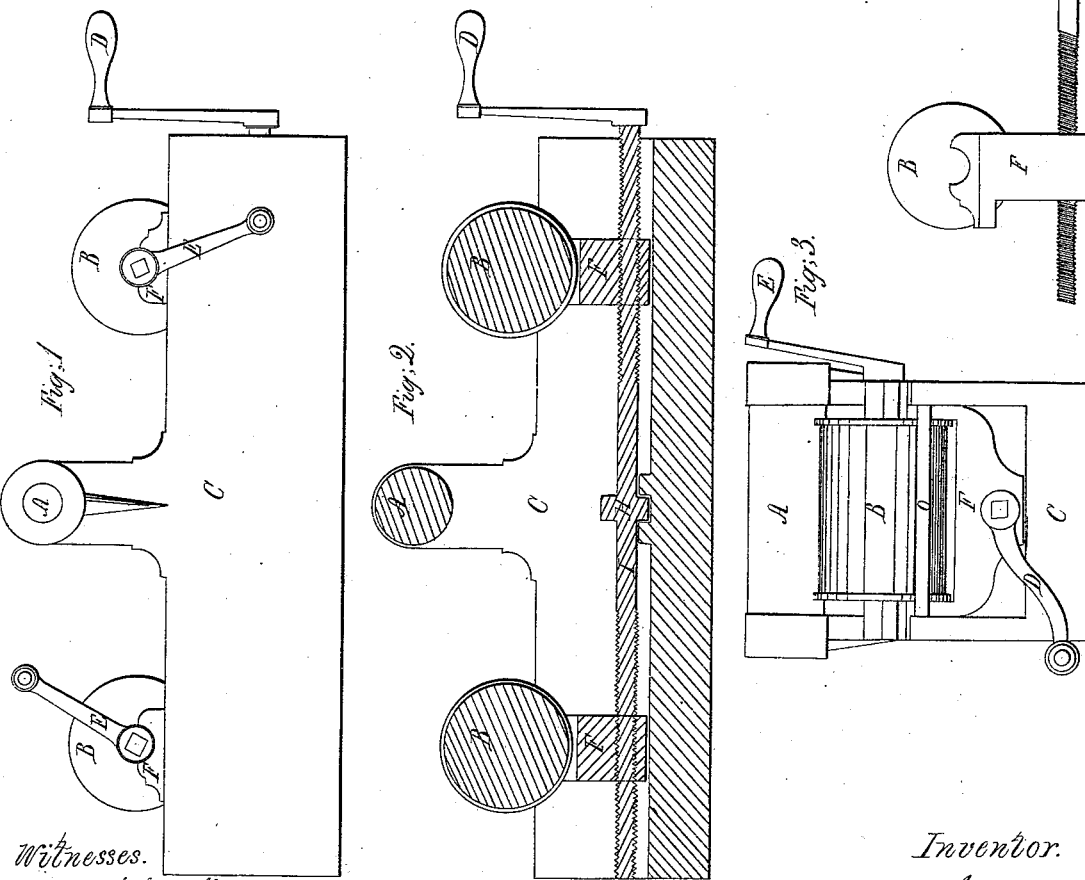

JAMES A. NIMAN AND BENJAMIN FIDLER, OF MANSFIELD, OHIO.

Letters Patent No. 64,351, dated April 30, 1867.

IMPROVED MACHINE FOR BENDING TIRES.

*The Schedule referred to in these Letters Patent and making part of the same.*

TO ALL WHOM IT MAY CONCERN:

Be it known that we, JAMES A. NIMAN and BENJAMIN FIDLER, of Mansfield, in the county of Richland, and State of Ohio, have invented a new and useful improvement in a Machine for Bending Tire for Wheels, &c.; and we do hereby declare that the following is a full, clear, and exact description of the construction and operation of the same, reference being had to the annexed drawings, making a part of this specification, in which—

Figure 1 is a side elevation.
Figure 2, a longitudinal section.
Figure 3, an end view.
Figure 4, a plan; and
Figure 5, the elevation of the right and left-hand screw, roller-carriages and rollers, as seen when detached from the rest of the machine.

In this machine, A is the fixed central roller; B, the traversing and working-rollers; C, the frame and bed of the machine; F, the carriages which carry the rollers B, which said carriages slide freely on and in the frame C; I is a right and left-hand screw, running through and tapped or screwed into the roller-carriages F, and which said screw is provided with a fast collar, H, which works freely in a recess fitted for the purpose in the bed of the machine; D is the handle to turn the screw, and E are the handles for turning the rollers B.

In operation, the rollers B are set at the required distance from the central roller A, to bend the iron to the required circle, by means of the right and left-hand screw, worked by the handle D, which slide the carriages F, which carry the rollers B nearer to or further from the central roller A the distance required. After the insertion of the iron into the rollers it is bent in the usual manner by turning the rollers B by means of their handles E.

Claim.

In this machine, we do not claim the frame C, or the rollers marked A and B, neither do we claim the handles E, all of which are now in use and well known; but what we do claim as our invention and improvement, and desire to secure by Letters Patent, is—

The right and left-hand screw I, provided with a collar, H, working in a recess in the bed of the machine, combined with the sliding or traversing-roller carriages F, which carry the rollers B, which said screw is tapped or screwed into and through the said roller-carriages F, and by means of which said combination we are enabled to set the rollers B equidistant nearer to or further from the central roller A for the purpose required, and retain them in place, all of which is substantially set forth, described, and shown in the accompanying drawings, and in this specification.

JAMES A. NIMAN,
BENJAMIN FIDLER.

Witnesses:
FREDERICK HOLEYWELL,
ISAAC J. MARKWARD.